United States Patent
Leong

(10) Patent No.: US 9,935,547 B2
(45) Date of Patent: Apr. 3, 2018

(54) SYSTEM AND METHOD FOR A SWITCHED-MODE POWER SUPPLY

(71) Applicant: Infineon Technologies Austria AG, Villach (AT)

(72) Inventor: Kenneth Kin Leong, Villach (AT)

(73) Assignee: INFINEON TECHNOLOGIES AUSTRIA AG, Villach (AT)

(*) Notice: Subject to any disclaimer, the term of this patent is extended or adjusted under 35 U.S.C. 154(b) by 30 days.

(21) Appl. No.: 15/098,038

(22) Filed: Apr. 13, 2016

(65) Prior Publication Data
US 2017/0302176 A1    Oct. 19, 2017

(51) Int. Cl.
| H02M 3/158 | (2006.01) |
| H02M 3/156 | (2006.01) |
| H02M 3/00 | (2006.01) |
| H02M 1/00 | (2006.01) |
| H02M 3/155 | (2006.01) |

(52) U.S. Cl.
CPC ............ H02M 3/158 (2013.01); *H02M 3/005* (2013.01); *H02M 3/156* (2013.01); *H02M 2001/0058* (2013.01); *H02M 2003/1557* (2013.01); *Y02B 70/1425* (2013.01); *Y02B 70/1491* (2013.01)

(58) Field of Classification Search
CPC . H02M 2007/4818; H02M 2007/4815; H02M 2001/0012; H02M 2001/0009; H02M 3/156; H02M 3/158; H02M 3/1588; H02M 3/155; H02M 3/1582; H02M 3/157; H02M 3/1563; H02M 2001/0058; H02M 3/005; H02M 2003/1557; Y02B 70/1425; Y02B 70/1491
See application file for complete search history.

(56) References Cited

U.S. PATENT DOCUMENTS

| 5,583,421 A * | 12/1996 | Barbehenn | H02M 3/005 323/222 |
| 8,026,704 B2 | 9/2011 | Kapels et al. | |
| 2007/0262760 A1 * | 11/2007 | Liu | H02M 3/1588 323/282 |
| 2009/0302814 A1 * | 12/2009 | Kapels | H02M 3/1588 323/282 |
| 2015/0280564 A1 * | 10/2015 | Siehl | H02M 3/1584 323/271 |

OTHER PUBLICATIONS

Chen, Y.C. et al., "Research on Active Clamped ZVS-SEPIC Converter," 2010 2nd International Conference on Industrial and Information Systems, Jul. 10-11, 2010, pp. 310-314.

(Continued)

*Primary Examiner* — Timothy J Dole
*Assistant Examiner* — Bryan R Perez
(74) *Attorney, Agent, or Firm* — Slater Matsil, LLP

(57) ABSTRACT

In accordance with an embodiment, a method of operating a switched-mode power includes turning on an output switch of the switched-mode power converter coupled to a supply output port of the switched-mode power converter, where an output switch current flows to the supply output port through the output switch in a first direction after turning on the output switch. The method further includes turning off the output switch a first period of time after the output switch current changes polarity from the first direction to a second direction opposite the first direction.

34 Claims, 13 Drawing Sheets

(56) References Cited

OTHER PUBLICATIONS

Kim, I. et al., "New Bidirectional ZVS PWM Sepic/Zeta DC-DC Converter," 2007 IEEE International Symposium on Industrial Electronics, Jun. 4-7, 2007, pp. 555-560.

Lin, B. et al., "Implementation of a Zero Voltage Switching Sepic-Cuk Converter," 2008 3rd IEEE Conference on Industrial Electronics and Applications, Jun. 3-5, 2008, pp. 394-399.

Marxgut, C. et al., "Interleaved Triangular Current Mode (TCM) resonant transition, single phase PFC rectifier with high efficiency and high power density," The 2010 International Power Electronics Conference (IPEC), Jun. 21-24, 2010, pp. 1725-1732.

* cited by examiner

US 9,935,547 B2

SYSTEM AND METHOD FOR A SWITCHED-MODE POWER SUPPLY

TECHNICAL FIELD

This disclosure relates generally to an electronic device, and more particularly, to a system and method for a switched-mode power supply.

BACKGROUND

Switched-mode circuits, including switched-mode power supplies and motor controllers, are pervasive in many electronic applications from computers to automobiles. Generally, voltages within a switched-mode power supply system are generated by performing a DC-DC, DC-AC, and/or AC-DC conversion by operating a switch coupled to an inductor or a transformer. Switched-mode power supplies are usually more efficient than other types of power conversion systems because power conversion is performed by controlled charging and discharging a low loss component, such as an inductor or transformer, therefore reducing energy lost due to power dissipation across resistive voltage drops. Similarly, switched-mode motor controllers may be used to efficiently commutate DC brushless motors with low losses in the driving circuitry.

Over the past few years, there has been increasing market pressure to both lower the cost and increase the power efficiency of switch-mode power supplies. For example, in low-power consumer products such as portable computers and smartphones, smaller, more efficient power supplies allow for longer battery life. Higher efficiencies also allow for smaller, more portable packaging that needs less heat sinking.

Generally, increasing the efficiency of a switched-mode power supply involves the reduction of power loss during the operation of the converter. Common causes of power loss in a switched-mode power supply include transistor switching losses, resistive losses in passive components, and core losses in the magnetic components. By addressing these losses, efficiency can be improved.

SUMMARY

In accordance with an embodiment, a method of operating a switched-mode power includes turning on an output switch of the switched-mode power converter coupled to a supply output port of the switched-mode power converter, where an output switch current flows to the supply output port through the output switch in a first direction after turning on the output switch. The method further includes turning off the output switch a first period of time after the output switch current changes polarity from the first direction to a second direction opposite the first direction.

BRIEF DESCRIPTION OF THE DRAWINGS

For a more complete understanding of the present invention, and the advantages thereof, reference is now made to the following descriptions taken in conjunction with the accompanying drawings, in which.

Figure 1A:
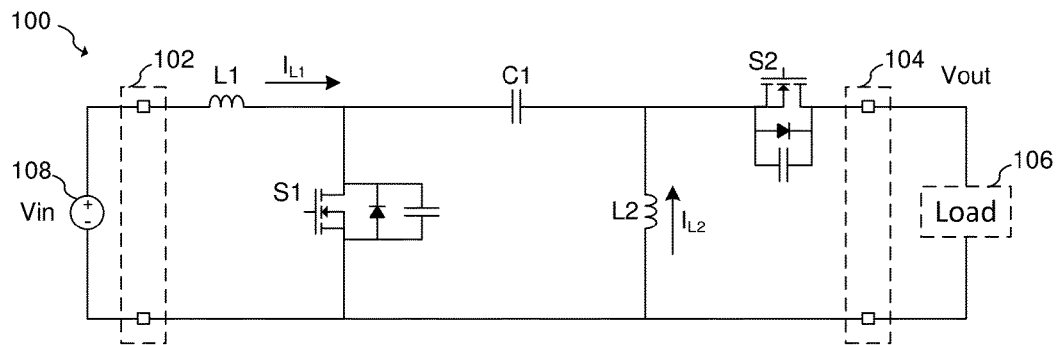
FIGS. 1a-1d illustrate SEPIC and Zeta converter topologies.

Corresponding numerals and symbols in different figures generally refer to corresponding parts unless otherwise indicated. The figures are drawn to clearly illustrate the relevant aspects of the preferred embodiments and are not necessarily drawn to scale. To more clearly illustrate certain embodiments, a letter indicating variations of the same structure, material, or process step may follow a figure number.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, a system and method for operating a single-ended primary-inductor converter (SEPIC) or a Zeta switched-mode power converter in which zero-voltage switching (ZVS) is achieved. Embodiments may also be directed toward other switched-mode and power supply circuits, for example, buck-boost DC-DC converters, AC-DC converters and DC-AC converters.

SEPIC and Zeta converters are gaining more interest in the electronics industry due to their ability achieve both bi-directional boost and buck conversion with a relatively small number of components and common ground. Furthermore, SEPIC and Zeta converters have the ability to achieve functional capacitive isolation. Because of this, SEPIC and Zeta converters may be used place of other isolating power converter topologies that contain large bulky transformers, thereby allowing for power converters of high density. However, conventional SEPIC and Zeta converters conventionally operate in continuous conduction mode (CCM), and are generally hard-switched, which means that the switches in the SEPIC and Zeta converters are turned-on when there is an appreciable voltage across them. This leads to appreciable switching losses depending on the particular implementation.

In an embodiment of the present invention, ZVS is achieved in a SEPIC or a Zeta switched-mode power converter by allowing the synchronous rectifier/output switch in the SEPIC or a Zeta switched-mode power converter to conduct in the reverse direction for a set period of time before turning it off. This causes a resonant condition in the SEPIC or Zeta switched-mode power converter that results in the lowering of the voltage across the input switch of the SEPIC or a Zeta switched-mode power converter. The input switch is then turned on once the voltage across the input switch drops below a threshold. The time at which the input switch is turned on may be determined by monitoring the voltage across the input switch or by waiting a predetermined period of time after the synchronous rectifier/output switch is turned off.

Similarly, ZVS may be achieved when turning on the synchronous rectifier/output switch a set period of time after turning off the input switch. The time at which the synchronous rectifier/output switch is turned on may be determined by monitoring the voltage across the synchronous rectifier/output switch or by waiting a predetermined period of time after the input switch is turned off. In some embodiments, ZVS may be achieved without adding additional switching components to the circuit, thereby allowing for a low cost, power efficient switched-mode power converter.

FIG. 1a illustrates a SEPIC converter 100 that is configured to transfer power from a source 108 at a first voltage Vin to a load 106 at a second voltage Vout. As shown, SEPIC converter 100 includes two switches S1 and S2, two inductors L1 and L2 and a capacitor C1 coupled between a supply input port 102 and a supply output port 104. Switch S1, which may be referred to an input switch is coupled to supply input port 102, and switch S2, which may be referred to as an output switch is coupled to supply output port 104. In embodiments of the present invention, switches S1 and S2 may be implemented using transistors including, but not limited to metal oxide semiconductor field effect transistors (MOSFETs), power MOSFETs, junction field effect transistor (JFETs) high electron mobility transistor (HEMT) such as gallium nitride (GaN) HEMTs and insulated gate bipolar transistors (IGBTs). The selection of which transistor to use may be made according to the specifications and voltage levels of the particular power converter being designed. Both switch S1 and switch S2 are shown coupled in parallel with a capacitor and with a diode. The capacitor represents the parasitic capacitance associated with the switch and the diode represents the body diode of the transistor used to implement the switch.

SEPIC converter 100 can be viewed as a boost converter that is cascaded with a buck-boost converter. During operation, switch S1 is turned-on and inductors L1 and L2 are magnetized through switch S1 while switch S2 is turned off. Next, switch S1 is turned-off and switch S2, which functions as a synchronous rectifier, is turned on. Currents $I_{L1}$ and $I_{L2}$ through inductors L1 and L2 are redirected to load 106 via switch S2.

Figure 1B:
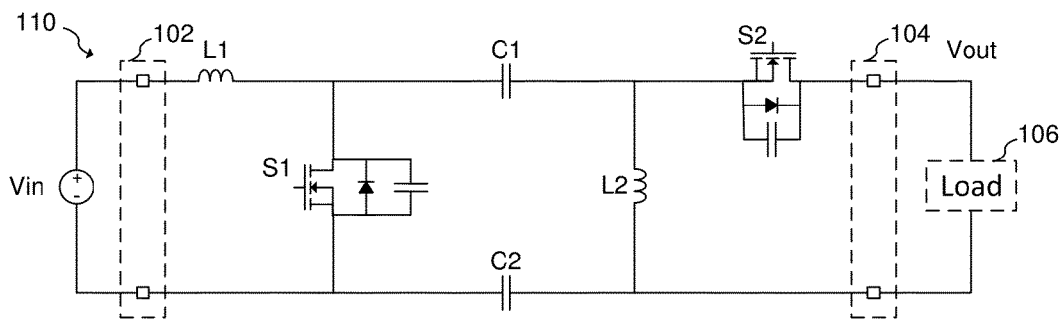

FIG. 1b illustrates a SEPIC converter 110 that is similar in structure as SEPIC converter 110 shown in FIG. 1a with the addition of a second capacitor C2. The additional of capacitor C2 allows for full capacitive isolation between supply input port 102 and supply output port 104.

Figure 1C:
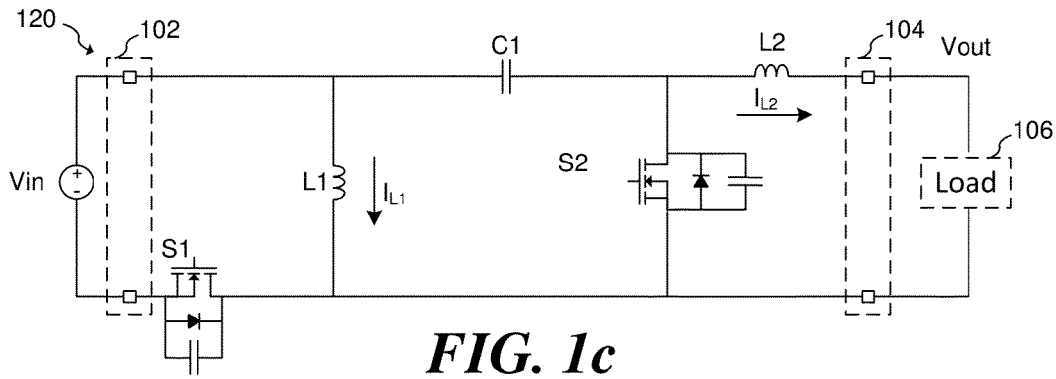

FIG. 1c illustrates a Zeta converter 120 that is configured to transfer power from source 108 at a first voltage Vin to a load 106 at a second voltage Vout. As shown, Zeta converter 120 also includes two switches S1 and S2, two inductors L1 and L2 and a capacitor C1 coupled between a supply input port 102 and a supply output port 104. During operation, switch S1 is turned-on and inductors L1 and L2 are magnetized through switch S1 while switch S2 is turned off. Next, switch S1 is turned-off and switch S2, which functions as a synchronous rectifier, is turned on. Currents $I_{L1}$ and $I_{L2}$ through inductors L1 and L2 circulate through switch S2 and load 106 as they demagnetize.

Figure 1D:
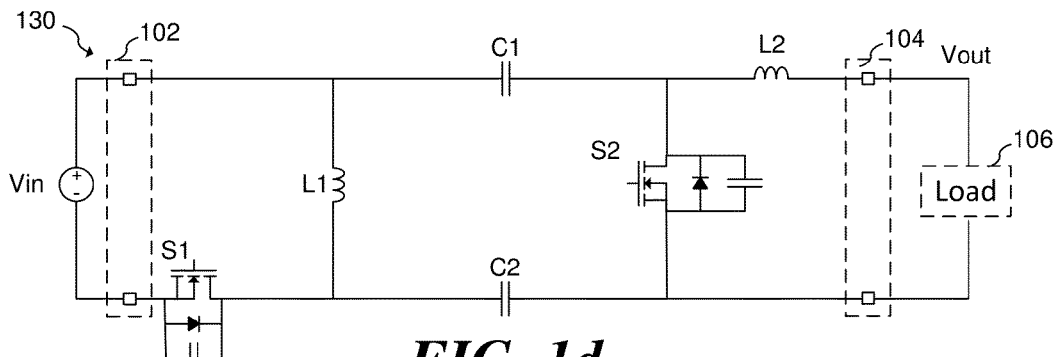

FIG. 1d illustrates Zeta converter 130 that is similar in structure as Zeta converter 120 shown in FIG. 1c with the addition of a second capacitor C2. The additional of capacitor C2 allows for full capacitive isolation between supply input port 102 and supply output port 104. It should be understood that each of the topologies shown in FIGS. 1a to 1d may be applied to embodiment switched-mode power converters described herein.

In embodiments of the present invention, ZVS is achieved for both switch S1 and switch S2 in the SEPIC and Zeta circuit configurations of FIGS. 1a-1d by extending the on-time of the secondary switch S2, and by allowing one of the inductors L1 and L2 to operate in a triangular current mode (TCM) in which current through the inductor changes polarity during operation cycles. In some embodiments, when the on-time of secondary switch S2 is extended, current is allowed to reverse direction in the switch.

In various embodiments, the selection of which one of the SEPIC or Zeta topologies to use may depend on the particular application. For example, if a low input current ripple is needed, such as in solar or power factor correction (PFC) systems, then a SEPIC topology can be used where the inductance of inductor L1 is greater than the inductance of inductor L1 (L1>L2), inductor L1 operates in constant conduction mode (CCM) and inductor L2 operates in TCM. On the other hand, if a low output current ripple is needed, such as in a battery charging system or a voltage regulation module (VRM), then a Zeta can be used where the inductance of inductor L2 is greater than the inductance of inductor L1 (L2>L1), L1 operates in TCM and L2 operates in CCM. In either the SEPIC or Zeta topologies, switch S1 turns using zero current switching (ZVS) and ZVS, and switch S2 turns off near ZCS and turns on at ZVS even though inductance L1 or inductance L2 is operating in CCM. In alternative embodiments, other topologies, relative inductance values and operation modes may be used to support various applications. In various embodiments, the SEPIC or Zeta converters may be bi-directionally operated.

In various embodiment SEPIC and Zeta converters, capacitors C1 and C2 are charged in both directions and conduct large currents during operation. If only a single capacitor C1 or C2 is used, this capacitor sees the full output voltage. If both C1 and C2 are used, the output voltage seen across these capacitors are divided in two (assuming capacitors C1 and C2 are the same size). In some embodiments, capacitors C1 and C2 may be specified to have a high voltage blocking capability in order to handle voltage isolation. In addition, capacitors having a low equivalent series resistance (ESR) may be used in order to reduce power loss. Suitable capacitors may include, but are not limited to ceramic, polyphenylene sulfide (PPS) film, Polypropylene (PP) film capacitors, silver mica and glass capacitors.

Figure 2A:
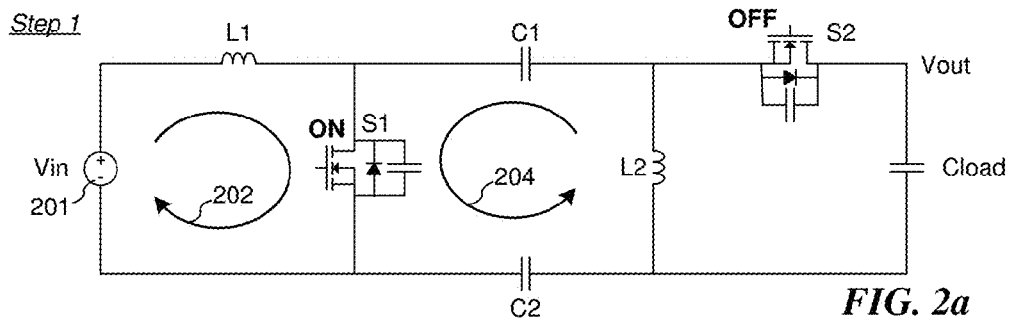
FIGS. 2a-2i illustrate current flow and switch states in a SEPIC converter according to an embodiment ZVS switching method.
Figure 2B:
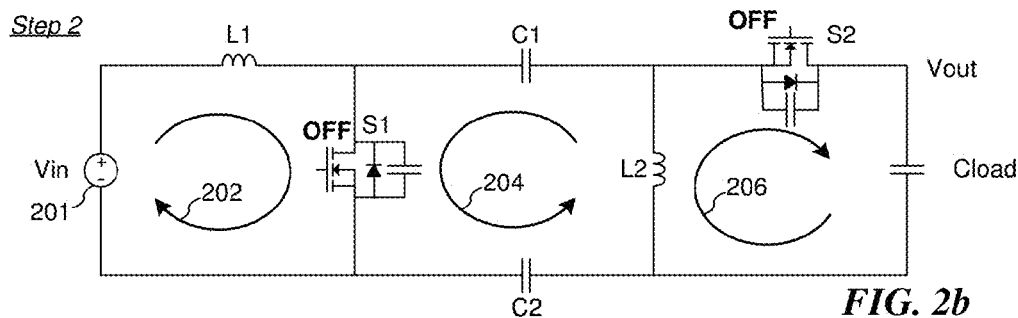
Figure 2C:
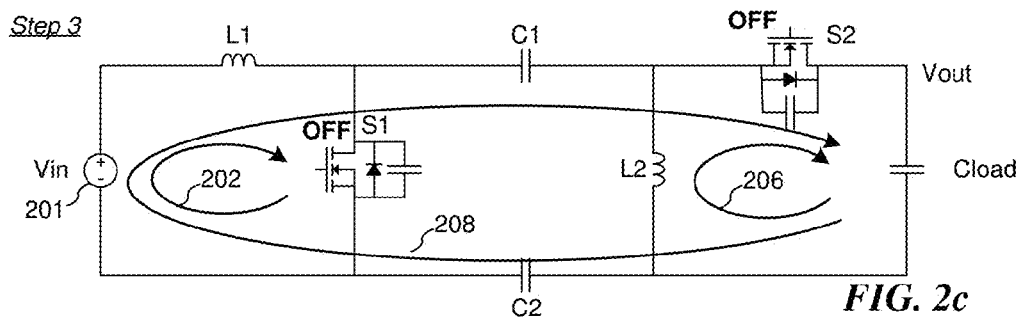
Figure 2D:
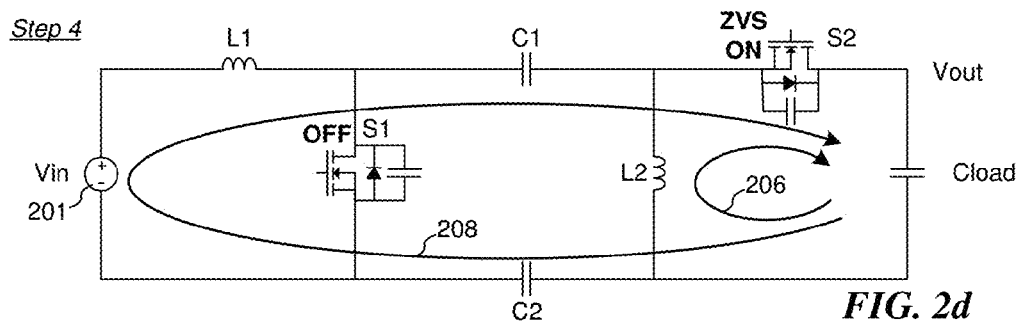
Figure 2E:
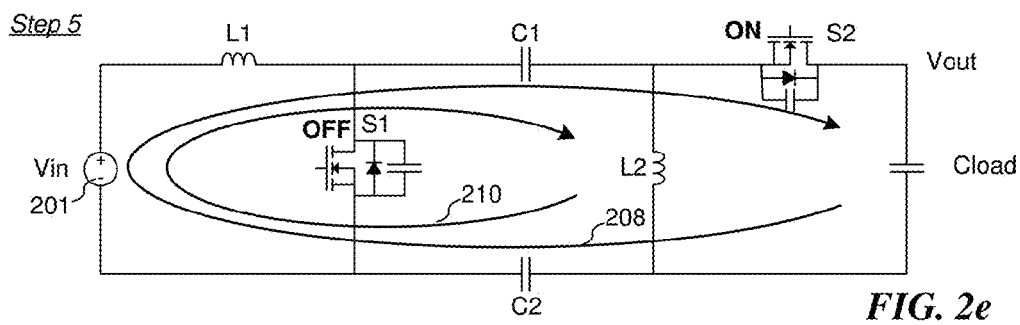
Figure 2F:
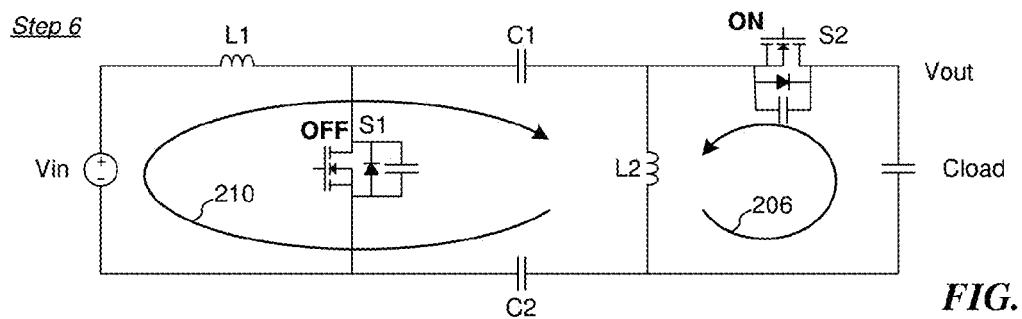
Figure 2G:
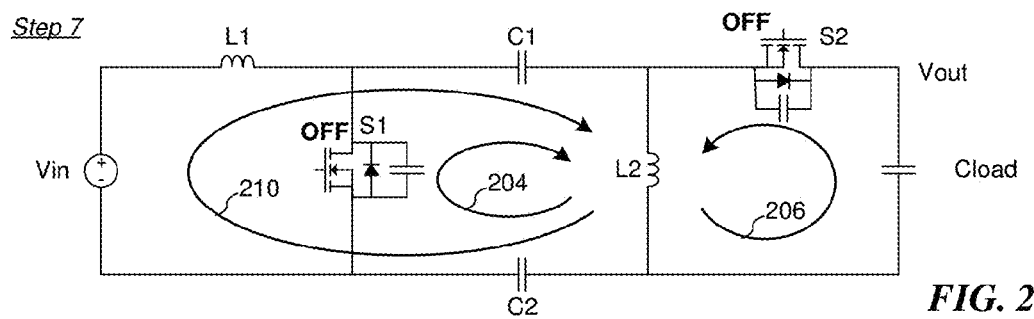
Figure 2H:
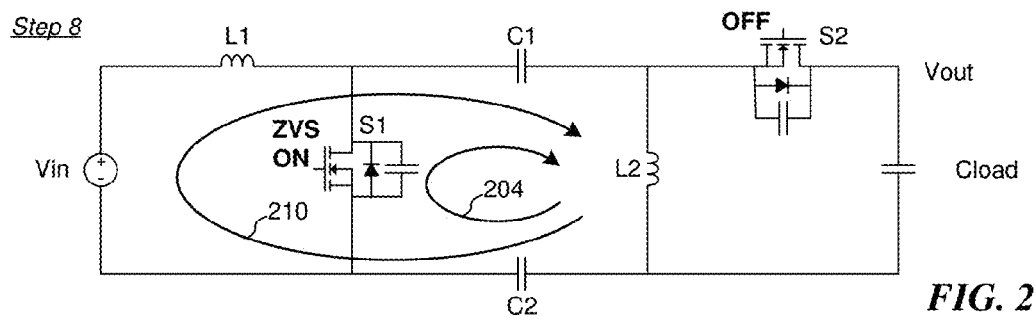
Figure 2I:
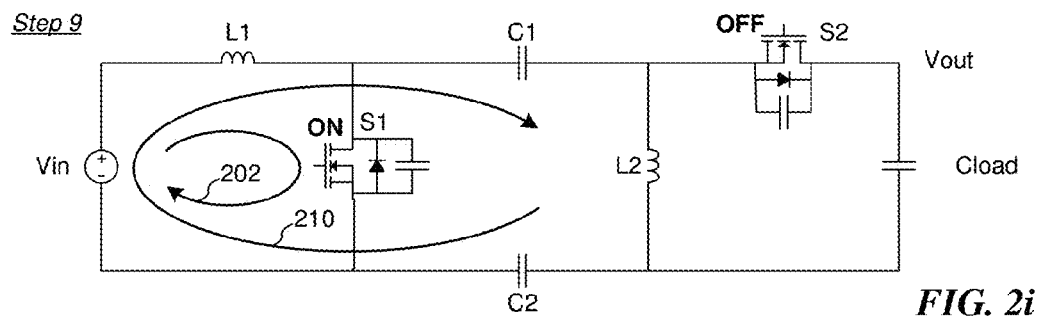
Figure 3A:
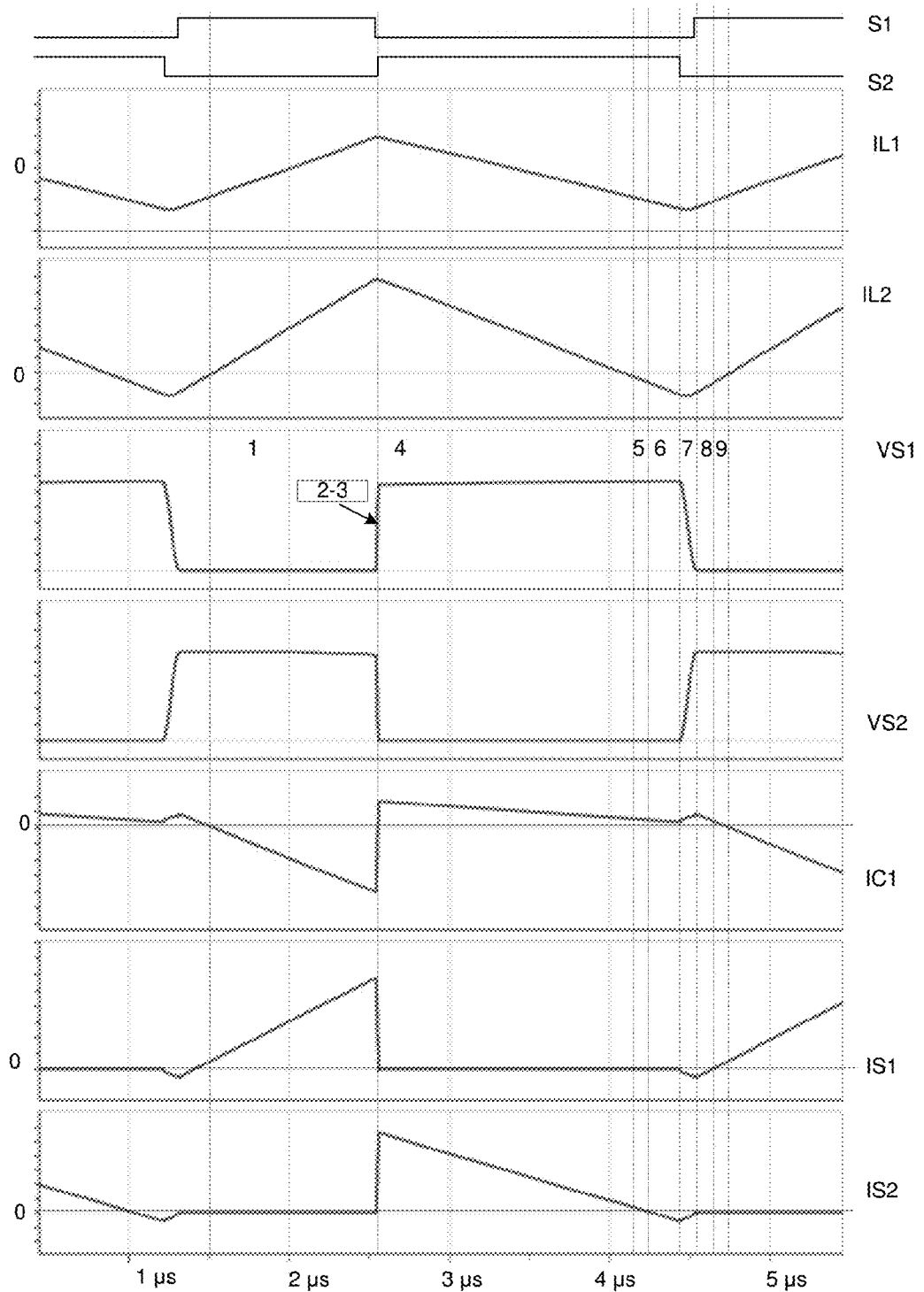
FIGS. 3a, 3b and 3c illustrate waveform diagrams that correspond with the SEPIC converter of FIGS. 2a-2i.
Figure 3B:
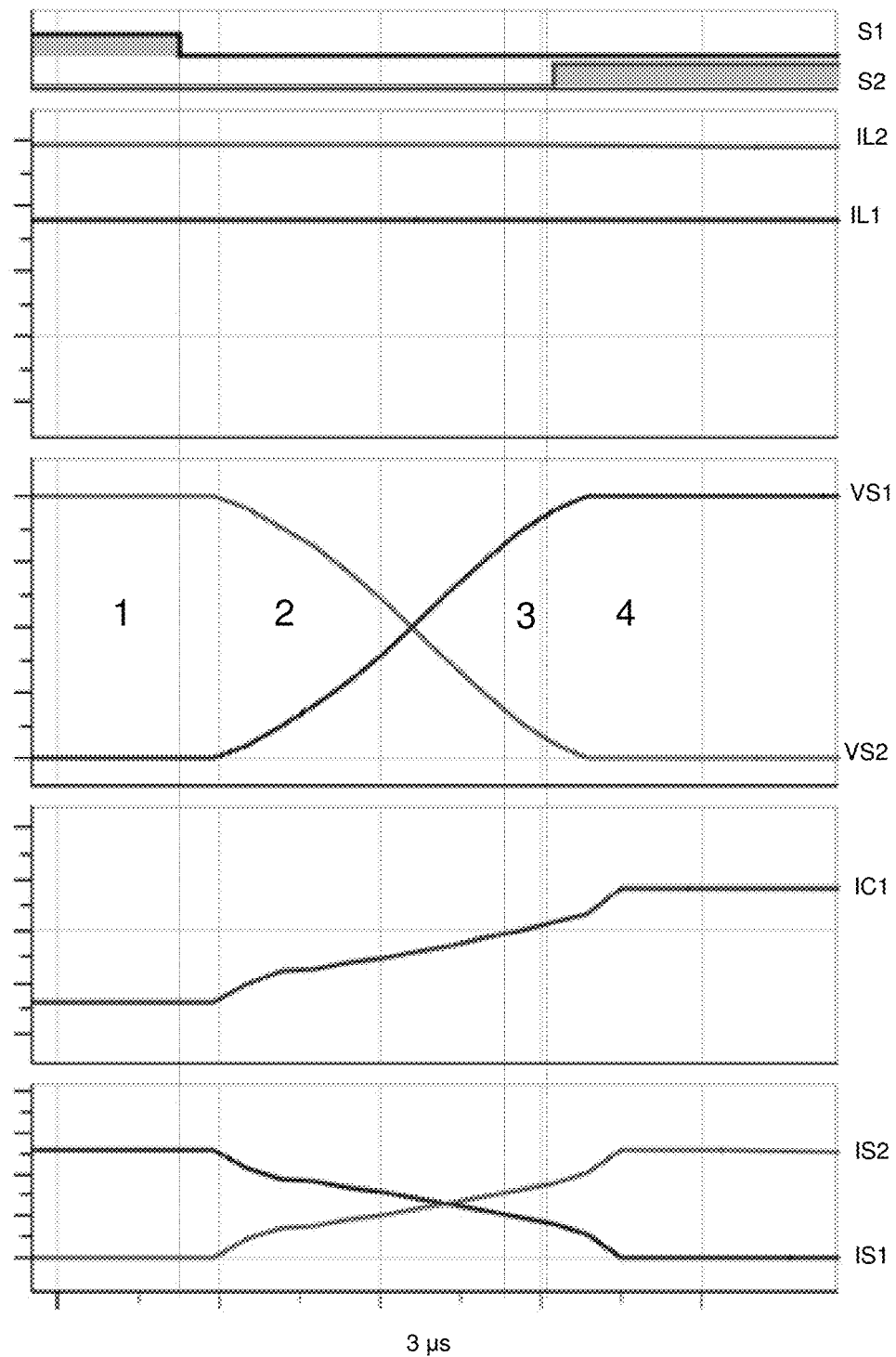
Figure 3C:
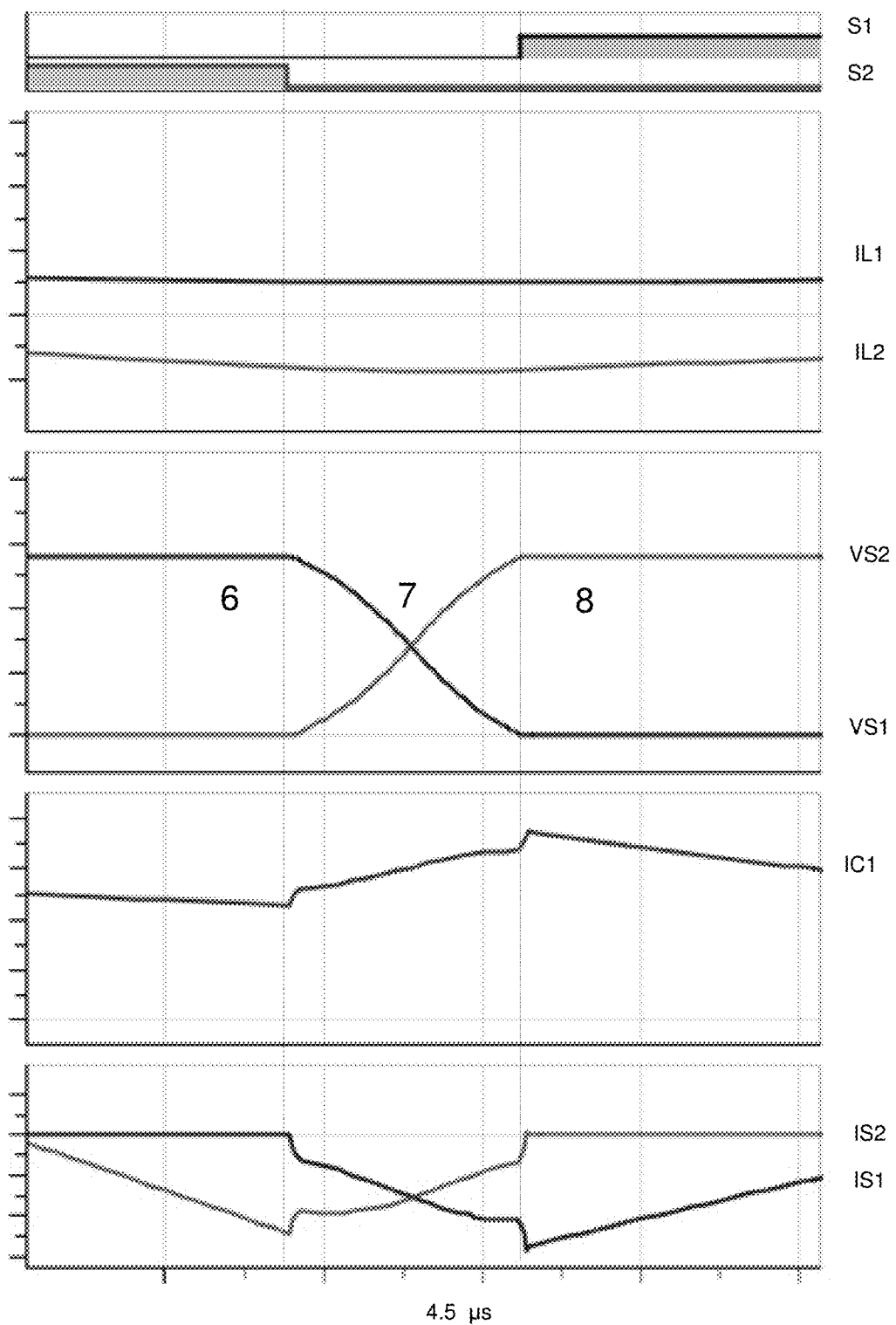

FIGS. 2a-2i illustrate a series of schematics and FIGS. 3a-3c illustrate accompanying waveform diagrams that show the operation of an embodiment SEPIC converter over a series of different operational steps. The waveform diagrams of FIGS. 3a-3c include switch control signals S1 and S2 with a high level corresponding to an on-state of the switch and a low level corresponding to an off-state of the switch; inductor currents IL1 through inductor L1 and IL2 through inductor L2; voltage VS1 across switch S1 and voltage VS2 across switch S2; current IC1 though capacitor C1 and current IS1 through switch S1. The waveform diagram of FIG. 3a shows an expanded time axis, the waveform diagram of FIG. 3b shows a detailed view of the transition between regions 1, 2, 3 and 4 of FIG. 3a, and the waveform diagram of FIG. 3c shows a detailed view of the transition between regions 6, 7 and 8 of FIG. 3a.

As shown in FIG. 2a, switch S1 is on, switch S2 is off and both inductors L1 are being energized in step 1. Inductor L1 is energized by the input voltage source 201 within current loop 202 and L2 is energized by the discharge of capacitors C1 and C2 within current loop 204. Step 1 corresponds to region 1 shown in the waveform diagram of FIG. 3a. Current IL1 increases through inductor L1, current L2 increases through inductor L2, and current IS1 increases through switch S1. Current IC1 through capacitor C1 decreases during this time period as it discharges into inductor L2.

In step 2 shown in FIG. 2b, switch S1 is turned off and some of the current IL2 though inductor L2 begins to discharge into the load represented by capacitor Cload via current loop 206 while discharging the output capacitance of switch S2. Step 2 corresponds region 2 shown in the waveform diagram of FIG. 3a and to region 2 of the expanded time axis waveform diagram of FIG. 3b. In addition, currents IL1 and IL2 through inductors L1 and L2 discharge the output capacitance of switch S2.

Next, in step 3 shown in FIG. 2c and in the waveform diagram of FIG. 3b, the current through capacitors C1 and C2 change direction as the current though inductor L1 is redirected away from switch S1. Essentially, capacitors C1 and C2 become charged by input voltage source 201 via inductor L1 and current loop 208. The output capacitance of switch S2 continues to discharge and approaches zero voltage due to a resonant condition established by output capacitance of switch S2 and the inductance of inductors L1 and L2. While the output capacitance of switch S2 is discharging, the voltage across S2 is positive and the body diode of S2 is reversed biased. Thus, the current of current loops 206 and 208 flows though the capacitance of switch S2. In some circumstances, the voltage across switch S2 may change polarity during step 3, in which case the body diode of switch S2 may become forward biased and conduct current to the load represented by capacitor Cload.

In step 4 illustrated in FIG. 2d, switch S2 is turned on when the voltage across switch S2 is near zero voltage and/or is within a threshold voltage of zero volts. In some embodiments, the voltage across switch S2 is measured, and the switch is turned on once the measured voltage drops below the threshold. Alternatively, switch S2 is turned on a predetermined time after switch S1 is turned off. In some embodiments, this timing may be based on a resonant time period of the circuit. This so called resonant time period to achieve ZVS is mainly based on the size of the output capacitance of switch S2. It is also in this case related to the energy stored in L2, the energy going through L1 and the magnitude of Vin+Vout. Once switch S2 is turned on, currents IL1 and IL2 in inductors L1 and L2 decreases, as is shown in FIG. 3a.

In step 5 illustrated in FIG. 2e, the current IL2 through inductor L2 changes polarity while the current IL1 through inductor L1 is maintained in the same direction. (See FIG. 3a.) As shown, inductor L1 provides current for inductor L2 via current loop 210 and the current for the load represented by Cload via current loop 208.

In step 6 illustrated in FIG. 2f and in the waveform diagrams of FIGS. 3a and 3c, the current IS2 through switch S2 changes polarity due to the change in polarity of current IL2 through inductor L2. In some embodiments, the negative current though switch S2 is maintained for a predetermined period of time before switch S2 is allowed to be shut off. The amount of time during which the negative current is set to flow through switch S2 may be dependent on the output capacitance of S1, the value of L2, the energy going through L1 and Vin+Vout. In some embodiments, the time period in which the negative current flows though switch S2 is kept long enough to achieve ZVS. In some embodiments extending the period of time during with the current flows though switch S2 shortens the ZVS time and increasingly discharges output capacitor Cload, which may affect the efficiency of the power converter. Accordingly the negative current time period time may be set to tradeoff and/or achieve specified ZVS time and power supply efficiency.

In step 7 illustrated in FIG. 2g and in the waveform diagrams of FIGS. 3a and 3c, switch S2 is turned off and a resonant period begins where inductor L2 discharge the output capacitance of switch S1. Once the voltage across switch S1 discharges within a threshold of zero volts, switch S1 is turned on in step 8, as illustrated in FIG. 2h and in the waveform diagrams of FIGS. 3a and 3c. After switch S1 turns on, the negative current through S2 diminishes to zero. In some embodiments, this zero voltage condition may be sensed by measuring the voltage across switch S1. Alternatively, switch S1 may be turned on after a fixed time delay from turning off switch S2.

In step 9, as illustrated in FIG. 2i, the current IS1 in S1 becomes positive. Current IL2 in inductor L2 remains negative until the current switches polarity. Once the current IL2 in inductor L2 changes polarity, operation returns to step 1 as illustrated in FIG. 2a.

Figure 4A:
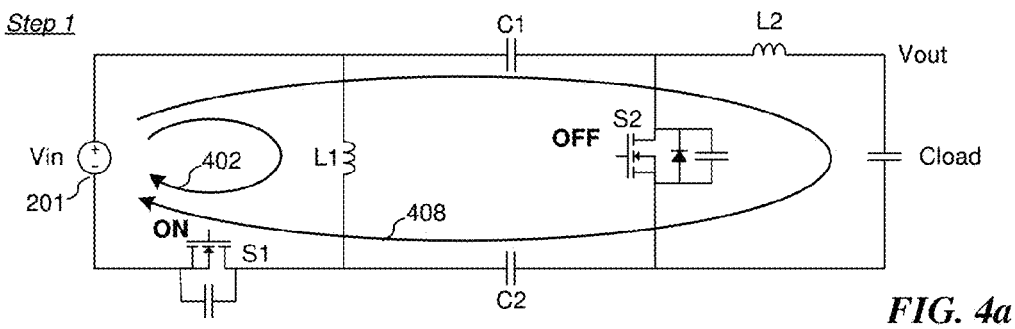
FIGS. 4a-4i illustrate current flow and switch states in a Zeta converter according to an embodiment ZVS switching method.
Figure 4B:
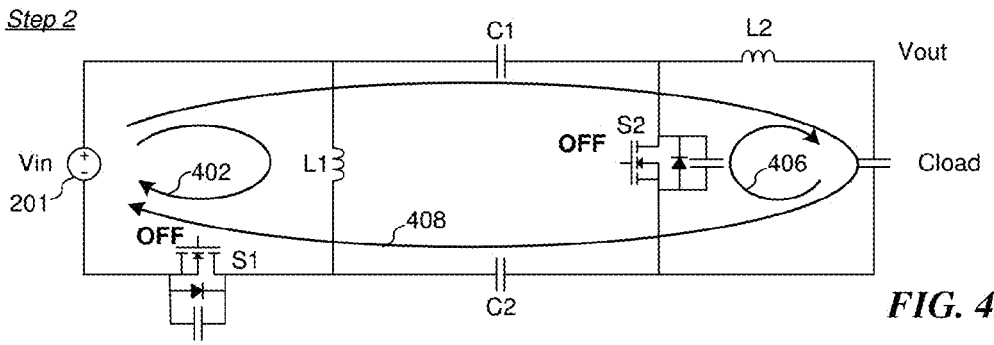
Figure 4C:
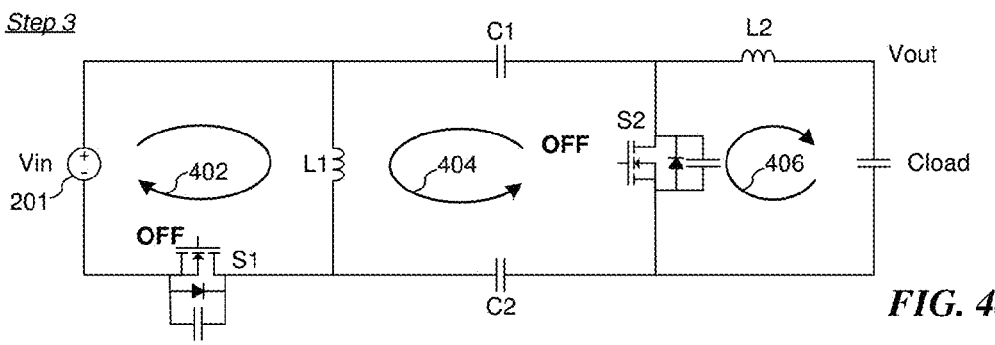
Figure 4D:
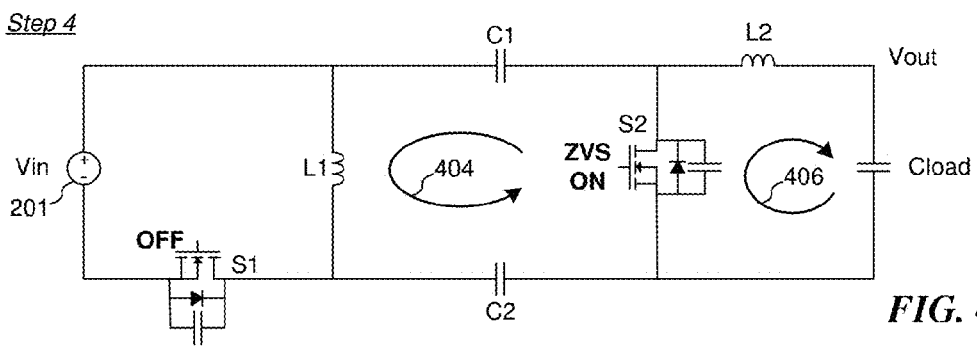
Figure 4E:
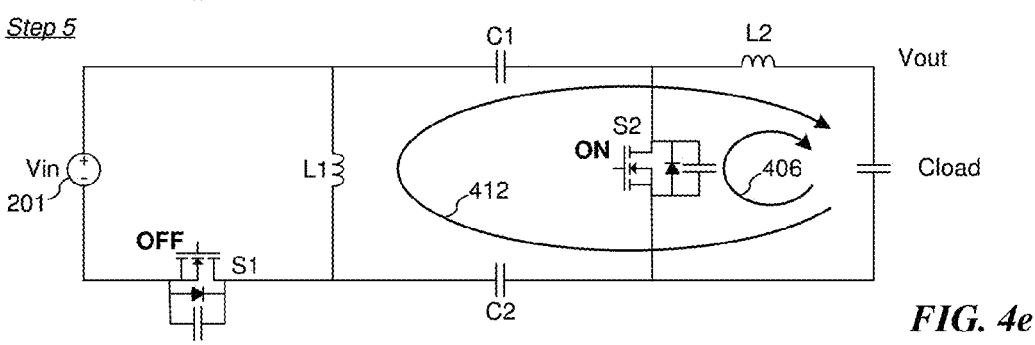
Figure 4F:
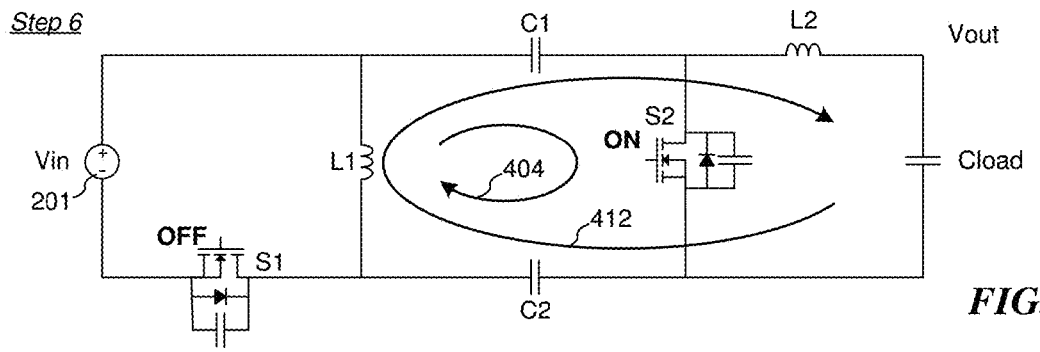
Figure 4G:
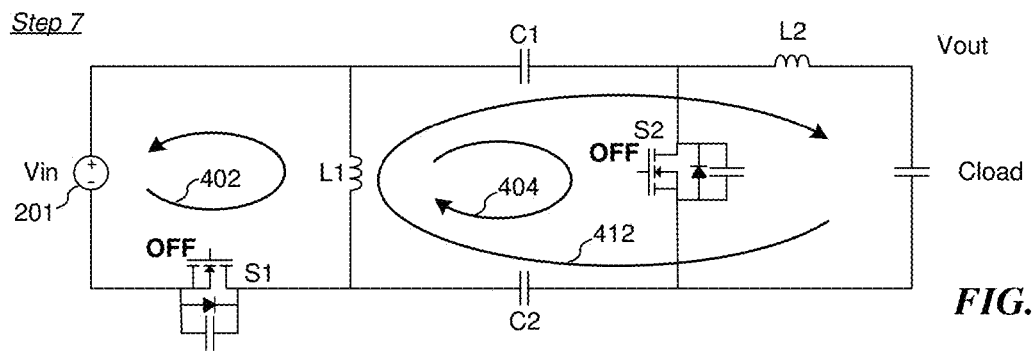
Figure 4H:
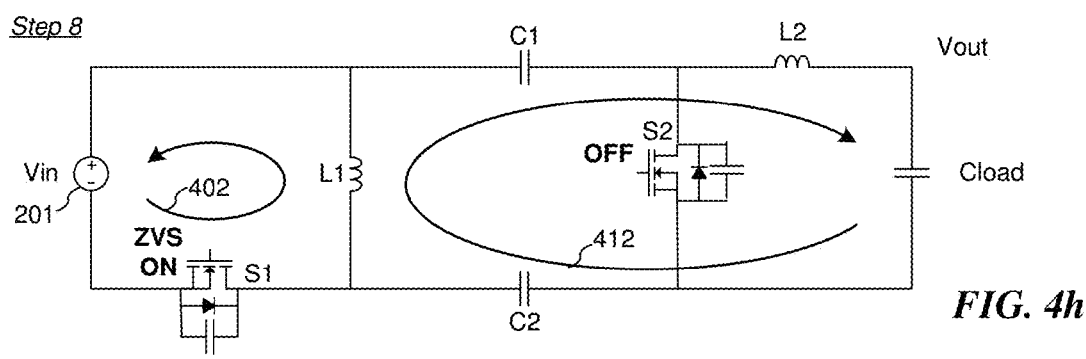
Figure 4I:
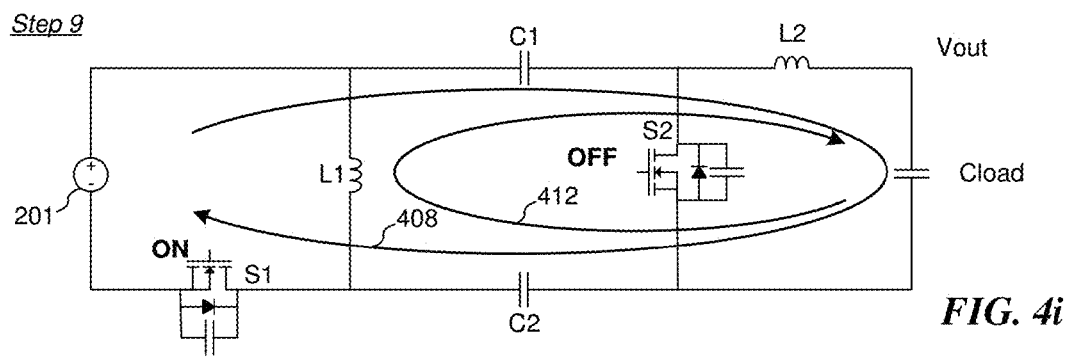
Figure 5A:
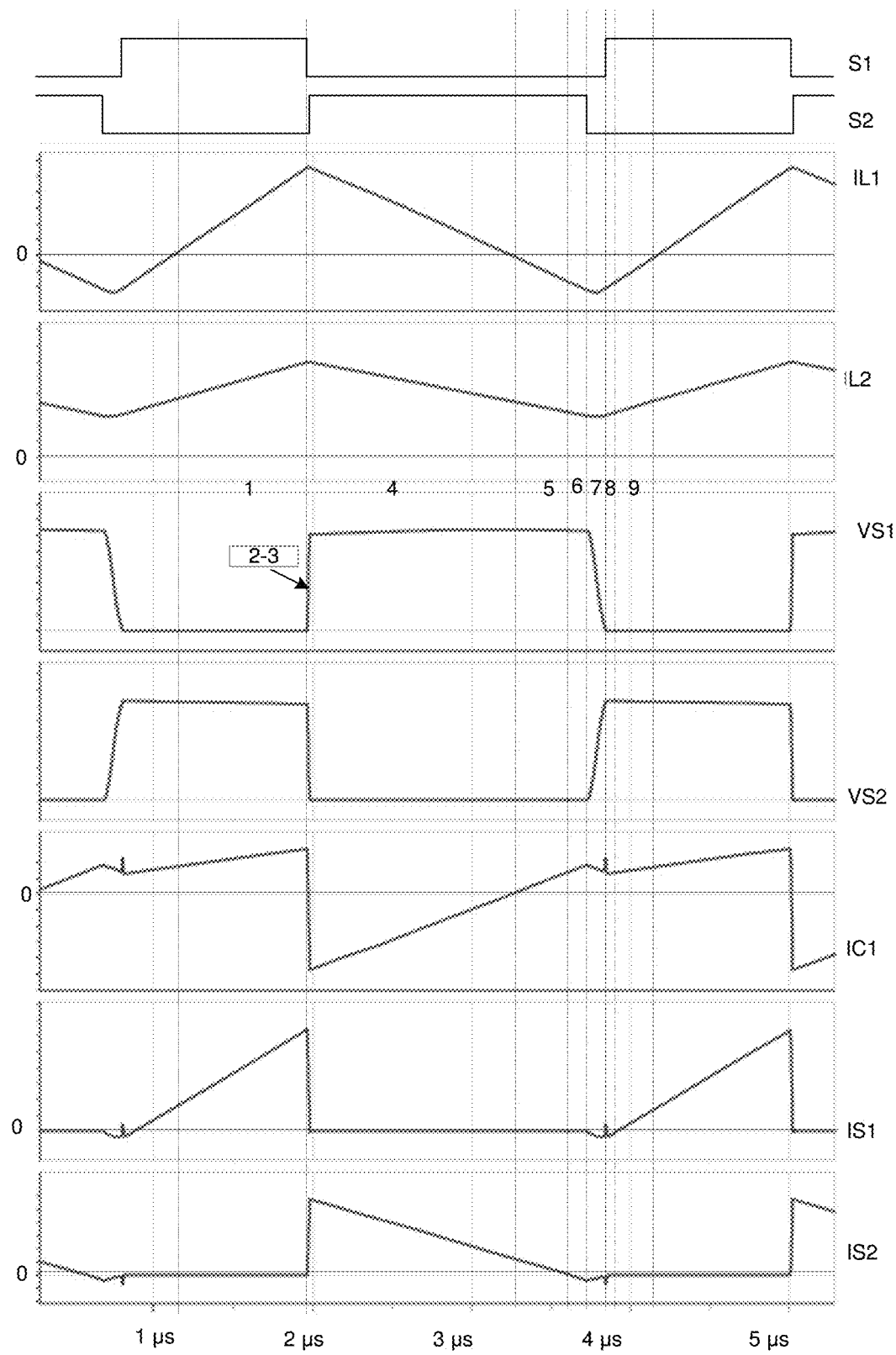
FIGS. 5a, 5b and 5c illustrate a waveform diagrams that correspond with the Zeta converter of FIGS. 4a-4i.
Figure 5B:
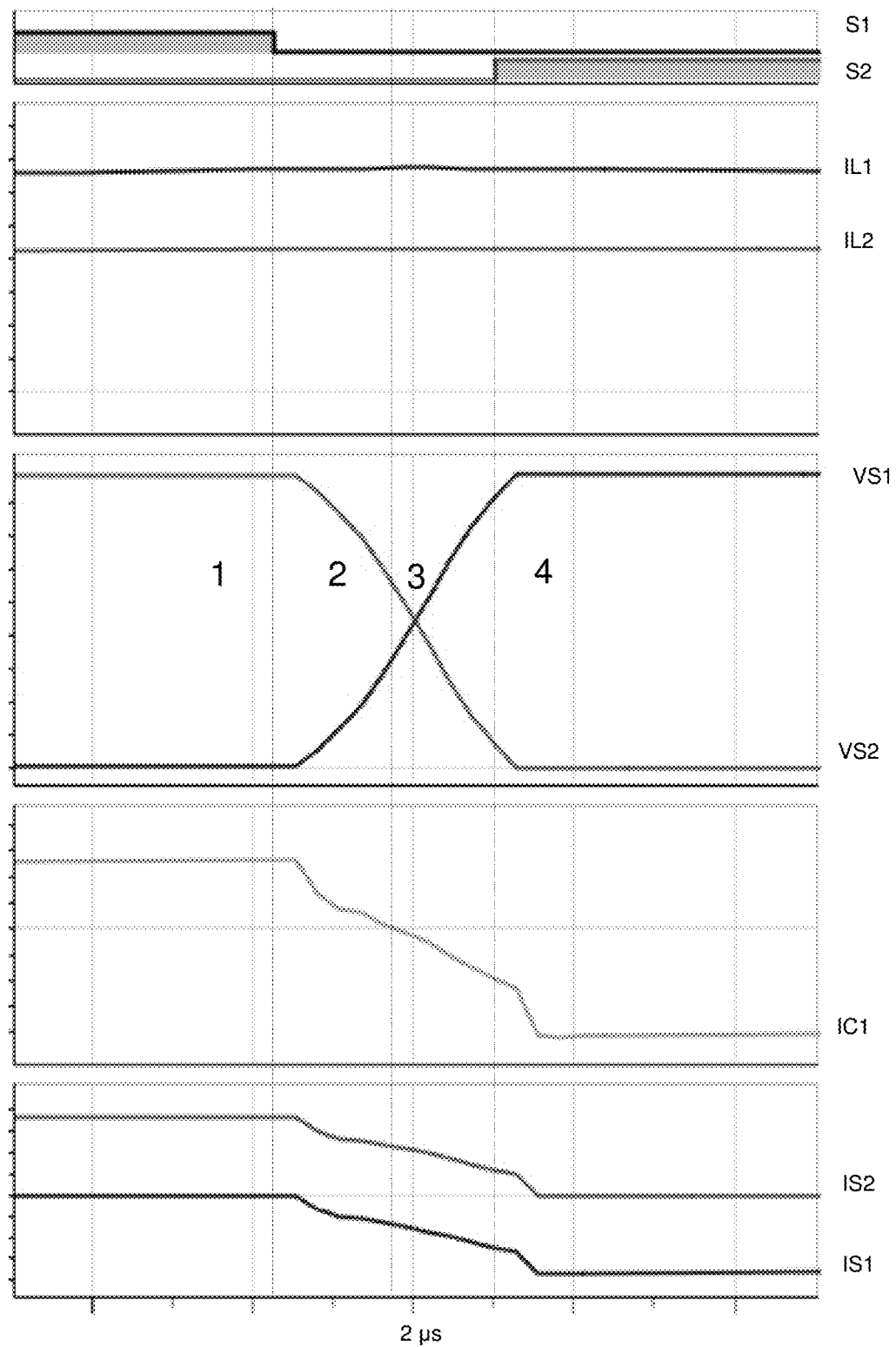
Figure 5C:
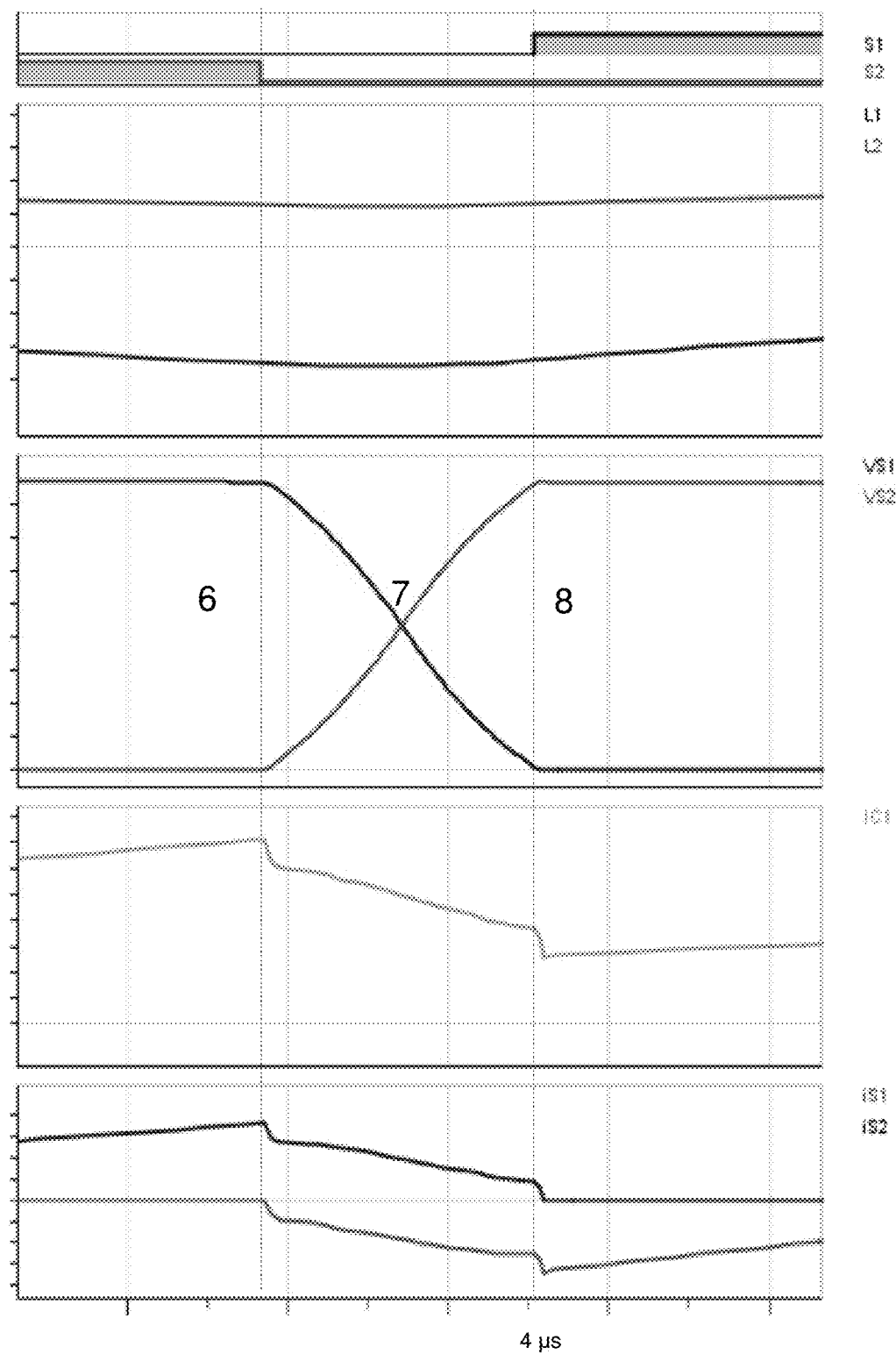

FIGS. 4a-4i illustrate a series of schematics and FIGS. 5a-5c illustrate accompanying waveform diagrams that show the operation of an embodiment Zeta converter over a series of different operational steps. The waveform diagrams of FIG. 5a-5c include switch control signals S1 and S2 with a high level corresponding to an on-state of the switch and a low level corresponding to an off-state of the switch; inductor currents IL1 through inductor L1 and IL2 through inductor L2; voltage VS1 across switch S1 and voltage VS2 across switch S2; current IC1 though capacitor C1 and current IS1 through switch S1. The waveform diagram of FIG. 5a shows an expanded time axis, the waveform diagram of FIG. 5b shows a detailed view of the transition between regions 1, 2, 3 and 4 of FIG. 5a, and the waveform diagram of FIG. 5c shows a detailed view of the transition between regions 6, 7 and 8 of FIG. 5a.

As shown in FIG. 4a, switch S1 is on, switch S2 is off and both inductors L1 are being energized in step 1. Inductor L1 is energized by the input voltage source 201 within current loop 402 and L2 is energized via capacitors C1 and C2 within current loop 408 and provides current to the load represented by capacitor Cload. Step 1 corresponds to region 1 shown in the waveform diagrams of FIGS. 5a and 5b. Current IL1 increases through inductor L1, current L2 increases through inductor L2, and current IS1 increases through switch S1.

In step 2 shown in FIG. 4b and in the waveform diagrams of FIGS. 5a and 5b, switch S1 is turned off and some of the current IL2 though inductor L2 discharges the output capacitance of switch S2 via current loop 406 and some of the current through inductor L1 discharges the output capacitance of switch S2 via current loop 408.

Next, in step 3 shown in FIG. 4c and in the waveform diagrams of FIGS. 5a and 5b, the current through capacitors C1 and C2 change direction as the current though loop 402 decreases as the capacitance of switch S1 charges up. The output capacitance of switch S2 continues to discharge via current loops 404 and 406 and approaches zero voltage due to a resonant condition established by output capacitance of switch S2 and the inductance of inductors L1 and L2. While the output capacitance of switch S2 is discharging, the voltage across S2 is positive and the body diode of S2 is reversed biased. Thus, the current of current loops 404 and 406 flows though the capacitance of switch S2. In some circumstances, the voltage across switch S2 may change polarity during step 3, in which case the body diode of switch S2 may become forward biased and conduct current to the load represented by capacitor Cload.

In step 4 illustrated in FIG. 4d an in the waveform diagrams of FIGS. 5a and 5b, switch S2 is turned on when the voltage across switch S2 is near zero voltage and/or is within a threshold voltage of zero volts. In some embodiments, the voltage across switch S2 is measured, and the switch is turned on once the measured voltage drops below the threshold. Alternatively, switch S2 is turned on a predetermined time after switch S1 is turned off. In some embodiments, this timing may be based on a resonant time period of the circuit. Similar to the embodiment of FIGS. 2a-2i, this resonant time period to achieve ZVS is mainly based on the size of the output capacitance of switch S2 and related to the energy stored in L2, the energy going through L1 and the magnitude of Vin+Vout. Once switch S2 is turned on, currents IL1 and IL2 in inductors L1 and L2 decreases, as is shown in FIG. 5.

In step 5 illustrated in FIG. 4e, the current IL1 through inductor L1 changes polarity while the current IL2 through inductor L2 is maintained in the same direction. (See FIG. 5a.) As shown, inductor L1 provides current for inductor L2 and the load represented by Cload via current loop 412.

In step 6 illustrated in FIG. 4f and in the waveform diagrams of FIGS. 5a and 5c, the current IS2 through switch S2 changes polarity due to the change in polarity of current IL1 through inductor L1. In some embodiments, the negative current though switch S2 is maintained for a predetermined period of time before switch S2 is allowed to be shut off. The amount of time during which the negative current is set to flow through switch S2 may be dependent on the output capacitance of S1, the value of L2, the energy going through L1 and Vin+Vout. In some embodiments, the time period in which the negative current flows though switch S2 is kept long enough to achieve ZVS. In some embodiments extending the period of time during with the current flows though switch S2 shortens the ZVS time and increasingly discharges output capacitor Cload, which may affect the efficiency of the power converter. Accordingly the negative current time period time may be set to tradeoff and/or achieve specified ZVS time and power supply efficiency.

In step 7 illustrated in FIG. 4g and in the waveform diagrams of FIGS. 5a and 5c, switch S2 is turned off and a resonant period begins where inductor L1 discharges the output capacitance of switch S1. Once the voltage across switch S1 discharges within a threshold of zero volts, switch S1 is turned on in step 8, as illustrated in FIG. 4h. After switch S1 turns on, the negative current through S2 diminishes to zero. In some embodiments, this zero voltage condition may be sensed by measuring the voltage across switch S1. Alternatively, switch S1 may be turned on after a fixed time delay from turning off switch S2.

In step 9, as illustrated in FIG. 4i, the current IS1 in S1 becomes positive. Current IL1 in inductor L1 remains negative until the current switches polarity. Once the current IL1 in inductor L1 changes polarity, operation returns to step 1 as illustrated in FIG. 4a.

Figure 6:
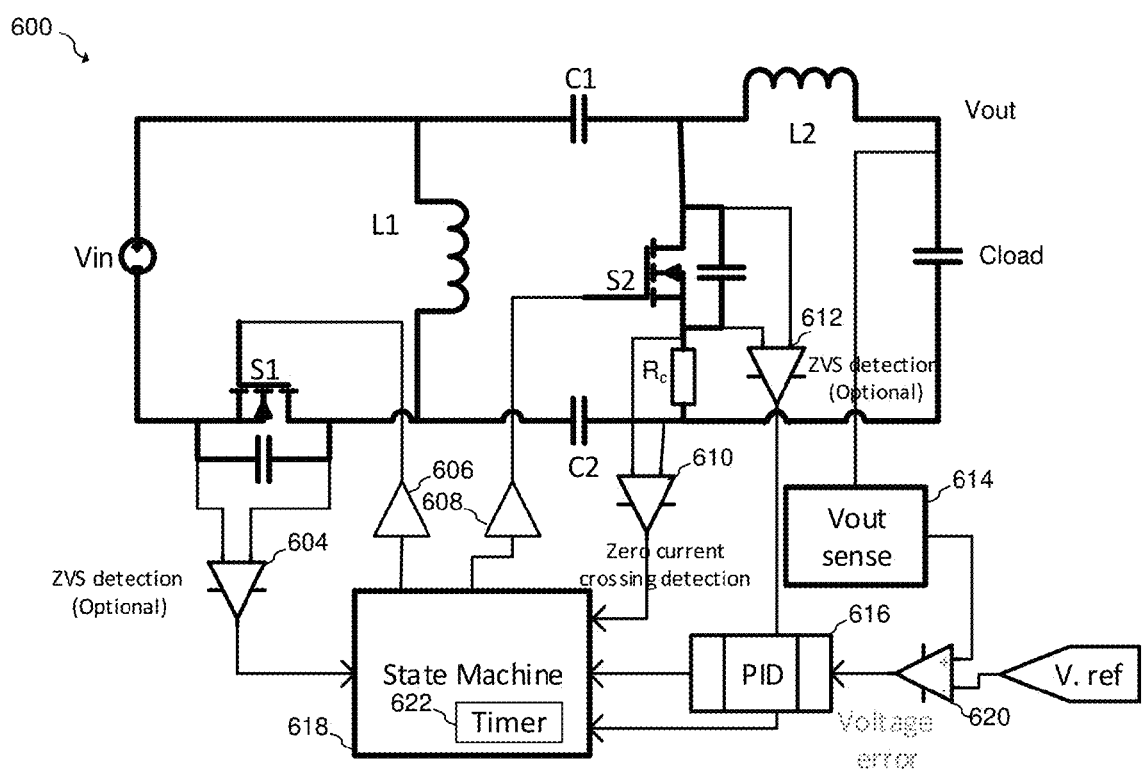
FIG. 6 illustrates an embodiment Zeta converter system including control circuitry.

FIG. 6 illustrates an embodiment Zeta converter 600 that includes control circuitry configured to implement embodiment ZVS switching methods. As shown, Zeta converter 600 includes a core converter that includes switches S1 and S2, inductors L1 and L2 and capacitors C1 and C2. In alternative embodiments, only a single capacitor, such as C1 may be used if full isolation is not necessary.

In an embodiment, state machine 618 controls switches S1 and S2 via switch drivers 606 and 608, and is responsible for the timing of when switches S1 and S2 turn on and turn off. In various embodiments, state machine 618 may apply control signals to switch drivers 606 and 608 in a cyclical or periodic manner using a pulse-width modulated signal, a pulse-frequency modulated signal or other periodic signals. Accordingly, in some embodiments, state machine 618 may include a pulse-width modulation circuit and/or a pulse frequency modulation circuit implemented using circuits and systems known in the art. As mentioned above, state machine 618 may determine the moment when switches S1 and S2 are turned on the basis of an internal timer 622, or the basis of ZVS detection circuits 604 and 612 that measure the voltage across switches S1 and S2, respectively, and compares the measured voltage to a threshold. In some embodiments, this threshold may be between about 40 V and about 100 V, for example in a power supply using N-Channel power MOSFETS, such as the CoolMOS™ brand of switching transistors produced by Infineon. Alternatively, other voltages may be used depending on the particular embodiment and its specifications. In one embodiment, each of ZVS detection circuits 604 and 612 includes a comparator that compares the voltage across each respective switch with a reference voltage.

A voltage control loop is formed by output voltage sensing circuit 614, error amplifier 620, proportional-integral-derivative (PID) controller 616 and state machine 618. During operation, Vout sensing circuit 614 scales output voltage Vout of Zeta converter 600 to a scaled voltage that can be conveniently processed by the control loop. In some embodiments, output voltage sensing circuit 614 may include a resistive voltage divider. In embodiments where there isolation between the input and output, voltage sensing circuit 614 may also include an isolation circuit such as an opto-isolator.

Error amplifier 620 compares the output of voltage sensing circuit 614 with a reference voltage and generates an error signal and may be implemented using a voltage amplifier that amplifies a difference between the output voltage sensing circuit 614 with the reference voltage. In some embodiments, this reference voltage is a scaled-down version of the desired output voltage. For example, if the desired output voltage at Vout is 20 V and output voltage sensing circuit 614 divides the output voltage by a factor of four, the reference voltage is 5 V. In an alternative embodiment, voltage sensing circuit 614 converts the output voltage into a current representing the output voltage Vout, and error amplifier 620 is implemented using a current amplifier that compares the current representing the output voltage to a reference current.

PID controller 616, which provides dynamic compensation for the power supply control loop, controls the on-time of switch S1. In embodiments that utilize pulse-width modulation, the output of PID controller controls the duty-cycle of switch S1. PID controller 616 may be implemented using PID controller circuits and methods known in the art. In alternative embodiments, PID controller 616 may be replaced by controller that uses a control algorithm different from PID, such as predictive control.

Zeta converter 600 may also include zero current crossing detector circuit 610 that is used to determine when the current through switch S2 changes polarity. By detecting the zero current crossing in switch S2, synchronization between the control circuitry and core Zeta circuit can be maintained. As shown, zero current crossing detector circuit 610 detects current though switch S2 by monitoring a voltage across resistor $R_c$ coupled in series with switch S2. Zero current crossing detector circuit 610, may be implemented using an amplifier or comparator. Alternatively, in some digital implementations, the output of zero current crossing detector is digitized using an analog-to-digital converter, the output of which is processed by state machine 618.

It should be understood that the control circuitry of FIG. 6 may also be implemented using digital control circuitry. For example, the output of voltage sensing circuit 614 may be converted to the digital domain using an analog-to-digital converter such that the function of error amplifier 620 and PID controller 616 is implemented in the digital domain using, for example, a microcontroller, microprocessor, custom logic or programmable logic. It should be further understood that the control circuitry shown in FIG. 6 may also be applied to the SEPIC topology.

Figure 7:
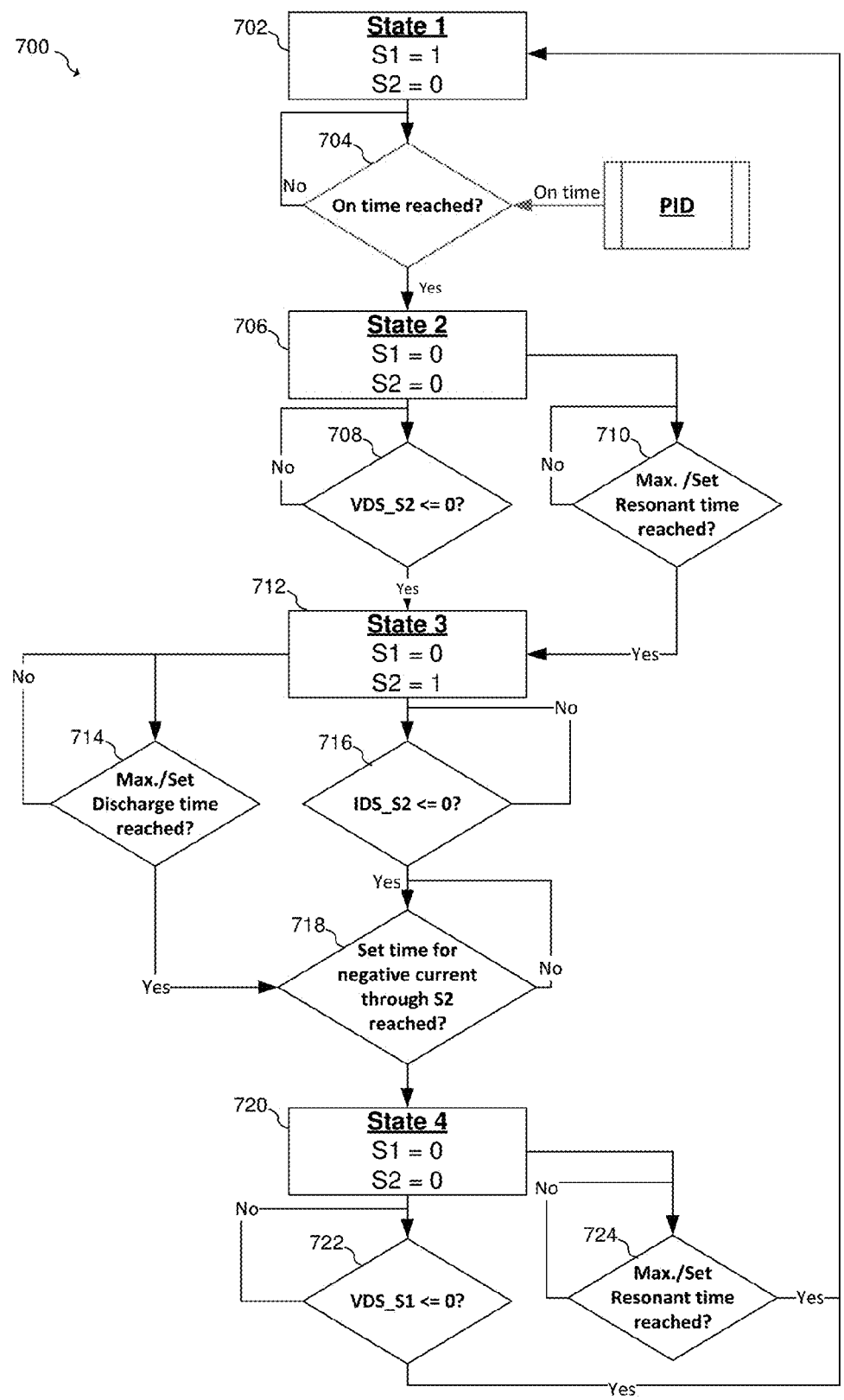
FIG. 7 illustrates a block diagram of an embodiment method.

FIG. 7 illustrates a flow chart of an embodiment method 700 that may be applied to state machine 618 shown in FIG. 6, and may be used as the basis for controlling either a SEPIC or a Zeta converter. As shown, operation begins at state 1 where first switch S1 is on and second switch S2 is off (step 702). In some embodiments, state 1 is associated with a period of time in which the current through inductors L1 and L2 are increasing. In step 704, the state machine determines whether an on-time provided by the PID controller has been reached. This determination may be made, for example, using a timer and/or a pulse-width modulation circuit. Once the on-time provided by the PID controller has been reached, the state machine enters state 2 in which switch S1 is turned off (step 706). At this point a resonant condition has been setup within the SEPIC or Zeta converter. In embodiments that utilize a time, the time elapsed time since switch S1 has been shut off is monitored in comparison to a maximum or set resonant time in step 710. Once the time has been reached, the state machine transitions to state 3 in which switch 2 is turned on (step 712). In some embodiments, the state machine transitions from state 2 to state 3 when a measurement of the voltage across switch S2 indicates that the voltage across the switch S2 becomes zero (step 708). In some embodiments, both steps 708 and 710 are implemented. For example, the time-out function of step 710 may be used to maintain synchronization of the state machine in case a transient of error condition prevents a zero voltage across switch S2 from being detected.

During state 3, the current though switch S2 is monitored in step 716. Once the current through switch S2 changes polarity to a negative current, the time during which the current is negative is monitored and compared to a predetermined set time in step 718. Once the time during which the current through switch S2 exceeds the predetermined set time, the state machine transitions from state 3 to state 4. In some conditions, such as start-up, the current through switch S2 may not change polarity. Because of this, the time during which switch S2 remains on is monitored and compared to a maximum discharge time in step 714. If the maximum discharge time is exceeded without the current though switch S2 changing polarity, the state machine transitions from state 3 to state 4 such that switch S2 turns off in step 720. This effectively resynchronizes the state machine at the possible cost of a non-ZVS turn-on for switch S1.

During state 4, both switches S1 and S2 are off, and the SEPIC or Zeta converter is in a resonant state with the voltage across switch S1 approaching zero volts. The state machine transitions from state 4 back to state 1 (in which S1 is turned on) when zero volts is detected across switch 2 (step 722) or when a maximum or set resonant time is reached (step 724). In embodiments in which the voltage across switch S1 is not measured, step 722 is omitted and the state machine transitions from state 4 back to state 1 when the maximum of set resonant time is reached in step 724.

Embodiments of the present invention are summarized here. Other embodiments can also be understood from the entirety of the specification and the claims filed herein. One general aspect includes a method of operating a switched-mode power converter including one of a SEPIC and a ZETA converter, the method including: turning on an output switch of the switched-mode power converter coupled to a supply output port of the switched-mode power converter, where an output switch current flows to the supply output port through the output switch in a first direction after turning on the output switch; and turning off the output switch a first period of time after the output switch current changes polarity from the first direction to a second direction opposite the first direction.

Implementations may include one or more of the following features. The method where the output switch current flows through at least one of a body diode and a parallel capacitance of the output switch in the first direction just prior to the turning on of the output switch. The method may further include using a timer to track the first period of time. In some embodiments, the method includes, after turning off the output switch, turning on an input switch of the switched-mode power converter when a voltage across the input switch decreases below a first threshold, where the input switch is coupled to a supply input port of the switched-mode power converter. The method may further include measuring the voltage across the input switch and comparing the measured voltage across the input switch with the first threshold.

In some embodiments, the method further includes turning-off the input switch after turning-on the input switch. The method may also include determining an on-time using a power supply controller, where turning off the input switch includes turning off the input switch in response to an expiration of the determined on-time after turning on the input switch. Turning on the input switch may include turning on the input switch after an expiration of a first predetermined resonant time after turning off the output switch; and turning on the output switch may include turning on the output switch after an expiration of a second predetermined resonant time after turning off the input switch.

In some embodiments, turning on the output switch includes turning on the output switch at a time when an input switch is off a first current through a first inductor flows in a first direction, and a current through a second inductor flows in the first direction, where the input switch is coupled to a supply input port of the switched-mode power converter, the first inductor coupled in series with a first one of the supply input port and the supply output port, a second inductor coupled in shunt with a second one of the supply input port and the supply output port, and a first capacitor coupled between the first inductor and the second inductor. Turning off the output switch initiates a first resonant period during which a voltage across the input switch decreases in some embodiments.

In an embodiment, the switched-mode power converter is a single-ended primary-inductor converter (SEPIC) including: a first circuit loop having a supply input port, a first inductor and an input switch; a second circuit loop having the input switch, a first capacitor and a second inductor; and a third circuit loop having the second inductor, the output switch and the supply output port. The first capacitor may be coupled between a first terminal of the input switch and a first terminal of the second inductor in the second circuit loop; and the second circuit loop may further include a second capacitor coupled between a second terminal of the input switch and a second terminal of the second inductor.

In an embodiment, the switched-mode power converter is a Zeta converter including a first circuit loop having a supply input port, a second inductor and an input switch, a second circuit loop having the second inductor, a first capacitor and the output switch, and a third circuit loop having the output switch, a first inductor and the supply output port. The first capacitor may coupled between a first terminal of the second inductor and a first terminal of the output switch in the second circuit loop; and the second circuit loop further includes a second capacitor coupled between a second terminal of the second inductor and a second terminal of the output switch. The method may further include coupling a supply input port to a source voltage; and coupling the supply output port to a load.

A further general aspect includes a power supply including: one of a SEPIC and a zeta converter including an output switch coupled to a supply output port; and a power supply controller configured to turn-on the output switch, where an output switch current flows to the supply output port through the output switch in a first direction after turning on the output switch, and turn-off the output switch a first period of time after the output switch current changes polarity from the first direction to a second direction opposite the first direction.

Implementations may include one or more of the following features. The power supply where the output switch current flows through at least one of a body diode and a parallel capacitance of the output switch in the first direction just prior to the power supply controller turning on the output switch. In some embodiments, the power supply controller includes a state machine; and the state machine is configured to turn-on the output switch and turn-off the output switch. The one of the SEPIC and a zeta converter may further include an input switch coupled to a supply input port; and the power supply controller may be further configured to, after the output switch is turned-off, turn-on the input switch when a voltage across the input switch decreases below a first threshold.

In an embodiment, the power supply further includes a first voltage measurement circuit coupled to the input switch, and the first voltage measurement circuit is configured to measure the voltage across the input switch and compare the measured voltage across the input switch with the first threshold. The power supply may further include a second voltage measurement circuit coupled to the output switch, and the second voltage measurement circuit may be configured to measure the voltage across the output switch and compare the measured voltage across the input switch with a second threshold. The power supply controller may be further configured to turn-off the input switch after turning-on the input switch.

In an embodiment, the power supply controller includes a control circuit configured to determine an on-time of the power supply; and the power supply controller is configured to turn off the input switch in response to an expiration of the determined on-time. The control circuit configured to determine the on-time of the power supply may include a PID controller. In an embodiment, the power supply controller is further configured to: turn-on the input switch after an expiration of a first predetermined resonant time; and turn-on the output switch after an expiration of a second predetermined resonant time.

The power supply may further include a first inductor coupled in series with a first one of the supply input port and the supply output port, a second inductor coupled in shunt with a second one of the supply input port and the supply output port, and a first capacitor coupled between the first inductor and the second inductor; and the power supply controller is further configured to turn-on the output switch by turning on the output switch at a time when the input switch is off, a first current flows through the first inductor in the first direction, and a current through the second inductor flows in the first direction, and turn-off the output switch initiates a first resonant period during which a voltage across the input switch decreases. The power supply controller may further include a first timer circuit configured to determine a first predetermined resonance time from when the input switch turns off, and determine a second predetermined resonance time from when the output switch turns off; and the power supply controller may configured to turn-on the input switch after an expiration of a first predetermined resonant time, and turn-on the output switch after an expiration of a second predetermined resonant time.

In some embodiments, the power supply controller further includes a current measurement circuit coupled to the output switch, where the current measurement circuit configured to measure the output switch current, and a timer circuit configured to determine when a first predetermined period of time expires after the output switch current changes polarity from the first direction to the second direction; and the power supply controller is further configured to turn off the output switch only after the first predetermined period of time expires.

In an embodiment, the power supply is a single-ended primary-inductor converter (SEPIC) including: a first circuit loop having a supply input port, a first inductor and an input switch a second circuit loop having the input switch, a first capacitor and a second inductor, and a third circuit loop having the second inductor, the output switch and the supply output port. In some embodiments, the first capacitor is coupled between a first terminal of the input switch and a first terminal of the second inductor in the second circuit loop; and the second circuit loop further includes a second capacitor coupled between a second terminal of the input switch and a second terminal of the second inductor.

In an embodiment, the power supply is a zeta converter including a first circuit loop having a supply input port, a second inductor and an input switch, a second circuit loop having the second inductor, a first capacitor and the output switch, and a third loop having the output switch, a first inductor and the supply output port. The first capacitor may be coupled between a first terminal of the second inductor and a first terminal of the output switch in the second circuit loop; and the second circuit loop further includes a second capacitor coupled between a second terminal of the second inductor and a second terminal of the output switch. The supply input port may coupled to a source voltage; and the supply output port may be coupled to a load.

A further general aspect includes a power supply including: one of a SEPIC and a zeta power supply converter having an input switch coupled to a supply input port and an output switch coupled to a supply output port; and a controller having a first output coupled to a control terminal of the input switch and a second output coupled to a control terminal of the output switch, where the controller is configured to: establish a resonant condition on the input switch by allowing a current through the output switch to reverse polarity for a first period of time, turn-on the input switch when a voltage across the input switch is below a first threshold, establish a resonant condition on the output switch after turning off the input switch, and turn-on the output switch when a voltage across the output switch is below a second threshold.

Implementations may include one or more of the following features. The power supply where the first threshold and the second threshold is zero volts.

Advantages of embodiments of the present invention include the ability to achieve ZVS turn-on for SEPIC and Zeta converters without adding additional components such as additional switches to the topology. With lower switching losses and no additional components, power density can be improved with respect to hard-switched SEPIC and Zeta converters.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of operating a switched-mode power converter comprising one of a SEPIC and a Zeta converter, the method comprising:
    turning on an output switch of the switched-mode power converter coupled to a supply output port of the switched-mode power converter, wherein an output switch current flows to the supply output port through the output switch in a first direction after turning on the output switch; and
    establishing a resonant condition by turning off the output switch a first period of time after the output switch current changes polarity from the first direction to a second direction opposite the first direction, wherein the resonant condition decreases a voltage across an input switch of the switched-mode power converter.

2. The method of claim 1, wherein the output switch current flows through at least one of a body diode and a parallel capacitance of the output switch in the first direction just prior to the turning on of the output switch.

3. The method of claim 1, further comprising using a timer to track the first period of time.

4. The method of claim 1, further comprising, after turning off the output switch, turning on input switch of the switched-mode power converter when the voltage across the input switch decreases below a first threshold due to the resonant condition, wherein the input switch is coupled to a supply input port of the switched-mode power converter.

5. The method of claim 4, further comprising measuring the voltage across the input switch and comparing the measured voltage across the input switch with the first threshold.

6. The method of claim 4, further comprising turning-off the input switch after turning-on the input switch.

7. The method of claim 6, further comprising determining an on-time using a power supply controller, wherein turning off the input switch comprises turning off the input switch in response to an expiration of the determined on-time after turning on the input switch.

8. The method of claim 6, wherein:
    turning on the input switch comprises turning on the input switch after an expiration of a first predetermined resonant time after turning off the output switch; and
    turning on the output switch comprises turning on the output switch after an expiration of a second predetermined resonant time after turning off the input switch.

9. The method of claim 1, wherein:
    turning on the output switch comprises turning on the output switch at a time when the input switch is off, a first current through a first inductor flows in a first direction, and a current through a second inductor flows in the first direction, wherein the input switch is coupled to a supply input port of the switched-mode power converter, the first inductor coupled in series with a first one of the supply input port and the supply output port, a second inductor coupled in shunt with a second one of the supply input port and the supply output port, and a first capacitor coupled between the first inductor and the second inductor.

10. The method of claim 1, wherein the switched-mode power converter is a single-ended primary-inductor converter (SEPIC) comprising:
    a first circuit loop having a supply input port, a first inductor and the input switch;
    a second circuit loop having the input switch, a first capacitor and a second inductor; and
    a third circuit loop having the second inductor, the output switch and the supply output port.

11. The method of claim 10, wherein:
    the first capacitor is coupled between a first terminal of the input switch and a first terminal of the second inductor in the second circuit loop; and
    the second circuit loop further comprises a second capacitor coupled between a second terminal of the input switch and a second terminal of the second inductor.

12. The method of claim 1, wherein the switched-mode power converter is a Zeta converter comprising
    a first circuit loop having a supply input port, a second inductor and the input switch,
    a second circuit loop having the second inductor, a first capacitor and the output switch, and
    a third circuit loop having the output switch, a first inductor and the supply output port.

13. The method of claim 12, wherein:
    the first capacitor is coupled between a first terminal of the second inductor and a first terminal of the output switch in the second circuit loop; and
    the second circuit loop further comprises a second capacitor coupled between a second terminal of the second inductor and a second terminal of the output switch.

14. The method of claim 1, further comprising:
    coupling a supply input port to a source voltage; and
    coupling the supply output port to a load.

15. A power supply comprising:
    one of a SEPIC and a Zeta converter comprising an output switch coupled to a supply output port; and
    a power supply controller configured to
        turn-on the output switch, wherein an output switch current flows to the supply output port through the output switch in a first direction after turning on the output switch, and
        establish a resonant condition by turning-off the output switch a first period of time after the output switch current changes polarity from the first direction to a second direction opposite the first direction, wherein the resonant condition decreases a voltage across an input switch of the power supply.

16. The power supply of claim 15, wherein the output switch current flows through at least one of a body diode and a parallel capacitance of the output switch in the first direction just prior to the power supply controller turning on the output switch.

17. The power supply of claim 15, wherein:
    the power supply controller comprises a state machine; and the state machine is configured to turn-on the output switch and turn-off the output switch.

18. The power supply of claim 15, wherein:
the one of the SEPIC and a Zeta converter further comprises the input switch coupled to a supply input port; and
the power supply controller is further configured to, after the output switch is turned-off, turn-on the input switch when a voltage across the input switch decreases below a first threshold due to the resonant condition.

19. The power supply of claim 18, further comprising a first voltage measurement circuit coupled to the input switch, the first voltage measurement circuit configured to measure the voltage across the input switch and compare the measured voltage across the input switch with the first threshold.

20. The power supply of claim 18, further comprising a second voltage measurement circuit coupled to the output switch, the second voltage measurement circuit configured to measure the voltage across the output switch and compare the measured voltage across the input switch with a second threshold.

21. The power supply of claim 18, wherein the power supply controller is further configured to turn-off the input switch after turning-on the input switch.

22. The power supply of claim 21, wherein:
the power supply controller comprises a control circuit configured to determine an on-time of the power supply; and
the power supply controller is configured to turn off the input switch in response to an expiration of the determined on-time.

23. The power supply of claim 22, wherein the control circuit configured to determine the on-time of the power supply comprises a PID controller.

24. The power supply of claim 21, wherein the power supply controller is further configured to:
turn-on the input switch after an expiration of a first predetermined resonant time; and
turn-on the output switch after an expiration of a second predetermined resonant time.

25. The power supply of claim 21, wherein:
the power supply further comprises a first inductor coupled in series with a first one of the supply input port and the supply output port, a second inductor coupled in shunt with a second one of the supply input port and the supply output port, and a first capacitor coupled between the first inductor and the second inductor; and
the power supply controller is further configured to
turn-on the output switch by turning on the output switch at a time when the input switch is off, a first current flows through the first inductor in the first direction, and a current through the second inductor flows in the first direction.

26. The power supply of claim 18, wherein:
the power supply controller further comprises a first timer circuit configured to determine a first predetermined resonant time from when the input switch turns off, and determine a second predetermined resonant time from when the output switch turns off; and
the power supply controller is configured to turn-on the input switch after an expiration of a first predetermined resonant time, and turn-on the output switch after an expiration of a second predetermined resonant time.

27. The power supply of claim 15, wherein:
the power supply controller further comprises
a current measurement circuit coupled to the output switch, the current measurement circuit configured to measure the output switch current, and
a timer circuit configured to determine when a first predetermined period of time expires after the output switch current changes polarity from the first direction to the second direction; and
the power supply controller is further configured to turn off the output switch only after the first predetermined period of time expires.

28. The power supply of claim 15, wherein the power supply is a single-ended primary-inductor converter (SEPIC) comprising:
a first circuit loop having a supply input port, a first inductor and the input switch
a second circuit loop having the input switch, a first capacitor and a second inductor, and
a third circuit loop having the second inductor, the output switch and the supply output port.

29. The power supply of claim 28, wherein:
the first capacitor is coupled between a first terminal of the input switch and a first terminal of the second inductor in the second circuit loop; and
the second circuit loop further comprises a second capacitor coupled between a second terminal of the input switch and a second terminal of the second inductor.

30. The power supply of claim 15, wherein the power supply is a Zeta converter comprising
a first circuit loop having a supply input port, a second inductor and the input switch,
a second circuit loop having the second inductor, a first capacitor and the output switch, and
a third loop having the output switch, a first inductor and the supply output port.

31. The power supply of claim 30, wherein:
the first capacitor is coupled between a first terminal of the second inductor and a first terminal of the output switch in the second circuit loop; and
the second circuit loop further comprises a second capacitor coupled between a second terminal of the second inductor and a second terminal of the output switch.

32. The power supply of claim 30, wherein:
the supply input port is coupled to a source voltage; and
the supply output port is coupled to a load.

33. A power supply comprising:
one of a SEPIC and a Zeta power supply converter having an input switch coupled to a supply input port and an output switch coupled to a supply output port; and
a controller having a first output coupled to a control terminal of the input switch and a second output coupled to a control terminal of the output switch, wherein the controller is configured to:
establish a first resonant condition on the input switch by allowing a current through the output switch to reverse polarity for a first period of time, wherein the first resonant condition reduces a voltage across the input switch,
turn-on the input switch when a voltage across the input switch is below a first threshold,
establish a second resonant condition on the output switch after turning off the input switch, wherein the second resonant condition reduces a voltage across the output switch, and
turn-on the output switch when a voltage across the output switch is below a second threshold.

34. The power supply of claim 33, wherein the first threshold and the second threshold is zero volts.

\* \* \* \* \*